(12) United States Patent
Khatod et al.

(10) Patent No.: US 9,251,557 B2
(45) Date of Patent: Feb. 2, 2016

(54) SYSTEM, METHOD, AND COMPUTER PROGRAM PRODUCT FOR RECOVERING FROM A MEMORY UNDERFLOW CONDITION ASSOCIATED WITH GENERATING VIDEO SIGNALS

(71) Applicant: NVIDIA Corporation, Santa Clara, CA (US)

(72) Inventors: Sarika Bhimkaran Khatod, Bangalore (IN); Mark Ernest Van Nostrand, Dripping Springs, TX (US); Karan Gupta, Noida (IN)

(73) Assignee: NVIDIA Corporation, Santa Clara, CA (US)

( * ) Notice: Subject to any disclaimer, the term of this patent is extended or adjusted under 35 U.S.C. 154(b) by 266 days.

(21) Appl. No.: 13/911,014

(22) Filed: Jun. 5, 2013

(65) Prior Publication Data

US 2014/0362094 A1    Dec. 11, 2014

(51) Int. Cl.
*G06T 1/60* (2006.01)
(52) U.S. Cl.
CPC .................................. *G06T 1/60* (2013.01)
(58) Field of Classification Search
CPC ......... G09G 5/393; G09G 5/39; G09G 5/363; G09G 5/395; G09G 5/001; G09G 5/222; G06T 1/60
See application file for complete search history.

(56) References Cited

U.S. PATENT DOCUMENTS

| | | | | |
|---|---|---|---|---|
| 4,295,135 A | * | 10/1981 | Sukonick | 345/641 |
| 5,050,102 A | * | 9/1991 | Sun et al. | 345/473 |
| 6,154,576 A | * | 11/2000 | Anderson et al. | 382/269 |
| 6,564,310 B2 | * | 5/2003 | Nakata et al. | 711/202 |
| 6,769,055 B1 | * | 7/2004 | Leung et al. | 711/220 |
| 7,215,339 B1 | * | 5/2007 | Dotson | 345/558 |
| 2003/0039266 A1 | * | 2/2003 | Hojo et al. | 370/465 |
| 2003/0138102 A1 | * | 7/2003 | Kohn et al. | 380/213 |
| 2005/0168635 A1 | * | 8/2005 | Wyman et al. | 348/448 |
| 2005/0212905 A1 | * | 9/2005 | Clarke et al. | 347/249 |
| 2013/0271791 A1 | * | 10/2013 | Miyazaki et al. | 358/2.1 |
| 2014/0232729 A1 | * | 8/2014 | Hakura et al. | 345/506 |

* cited by examiner

*Primary Examiner* — Todd Buttram
(74) *Attorney, Agent, or Firm* — Zilka-Kotab, PC

(57) ABSTRACT

A system, method, and computer program product for recovering from a memory underflow condition associated with generating video signals are disclosed. The method includes the steps of determining that a first counter is greater than a second counter, incrementing an address corresponding to a memory fetch request by an offset, and issuing the memory fetch request to a memory. The first counter represents a number of pixels that have been read by a display pipeline for a current frame and the second counter represents a number of pixels requested from a memory for the current frame.

18 Claims, 9 Drawing Sheets

SYSTEM, METHOD, AND COMPUTER PROGRAM PRODUCT FOR RECOVERING FROM A MEMORY UNDERFLOW CONDITION ASSOCIATED WITH GENERATING VIDEO SIGNALS

FIELD OF THE INVENTION

The present invention relates to generating video data for display, and more particularly to memory systems associated with a graphics processing unit.

BACKGROUND

Conventional electronic systems generate computer-rendered graphics for display on display devices such as a liquid crystal display (LCD). In a typical system, a central processing unit (CPU) is coupled to a graphics processing unit (GPU) that has a dedicated video memory for storing computer-rendered pixel data for display on a screen. The GPU renders pixel data from two-dimensional or three-dimensional graphics primitives and copies the pixel data to a frame buffer in the video memory. Then, a display controller within the GNU reads the pixel data from the frame buffer and generates video signals for output to the display device.

The video signals are time-sensitive. The display device may be configured to operate at a specific refresh frequency such as 60 Hz. In other words, each pixel in the display device is updated a number of times per second (e.g., 60 times per second). The timing requirements for the video signals are precise, but the video memory typically operates asynchronously from the display controller. In other words, the display controller transmits a request to the video memory to read the pixel data for a particular line of pixels some time before that pixel data is utilized to generate the time-sensitive video signals. However, multiple clients may attempt to access the video memory at the same time. For example, the CPU may be writing data to the video memory that is used to generate pixel data for the next frame of video, the graphics pipeline may access the data to generate the pixel data, or the graphics pipeline may write pixel data to the frame buffer in the video memory. Because the bandwidth of the video memory is limited, a memory fetch request submitted to the video memory may be delayed for a number of clock cycles before the pixel data associated with the fetch request is returned to the display controller. If the delay is long enough, then the pixel data received by the display controller corresponds to a particular point in the video signals that was already sent to the display. Thus, the pixel data must be discarded and the video signals sent to the display contained invalid data for those particular pixels. This condition is referred to herein as a memory underflow condition where the memory request is not returned in time to meet the timing requirements of the video signals. Thus, there is a need for addressing this issue and/or other issues associated with the prior art.

SUMMARY

A system, method, and computer program product for recovering from a memory underflow condition associated with generating video signals are disclosed. The method includes the steps of determining that a first counter is greater than a second counter, incrementing an address corresponding to a memory fetch request by an offset, and issuing the memory fetch request to a memory. The first counter represents a number of pixels that have been read for a current frame and the second counter represents a number of pixels requested from a memory for the current frame.

DETAILED DESCRIPTION

A display controller is described below that is configured to alleviate display issues caused by a memory underflow condition. The display controller analyzes the extent of the memory underflow condition, and if the magnitude of the memory underflow condition is above a threshold, then the display controller skips fetching a portion of the pixel data for the current frame from the video memory. Instead, the display controller advances to a line of pixels further down the frame and fetches the new line of pixel data, conceding that the pixel data in front of the advanced line of pixel data will probably not be returned to the display controller in time to be utilized to generate the video signals. The effect of this technique is to attempt to recover from memory underflow conditions fast enough that video artifacts caused by the memory underflow conditions are corrected by the next frame.

Figure 1:
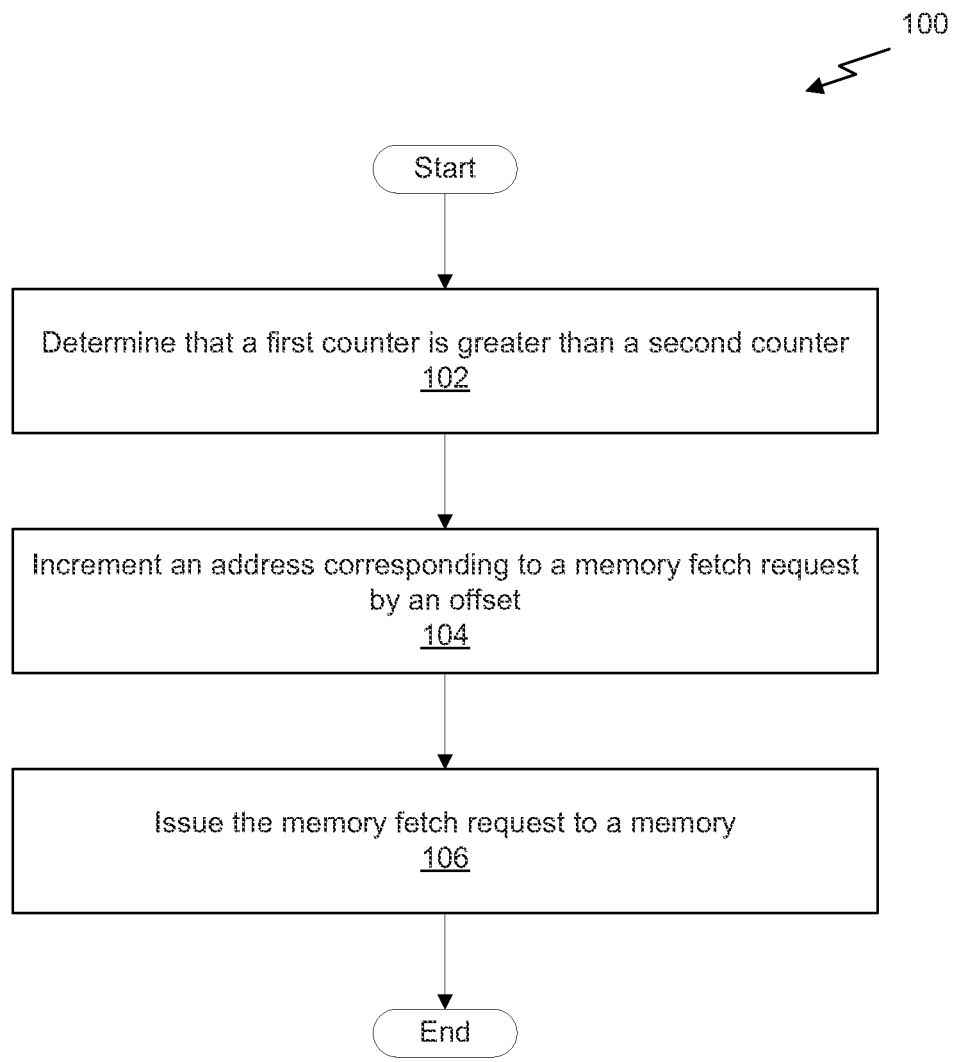
FIG. 1 illustrates a flowchart of a method for recovering from a memory underflow condition, in accordance with one embodiment.

FIG. 1 illustrates a flowchart of a method 100 for recovering from a memory underflow condition, in accordance with one embodiment. At step 102, a display controller determines that a first counter is greater than a second counter. In one embodiment, the first counter represents a number of pixels that have been read by a display pipeline for a current frame and the second counter represents a number of pixels requested from a memory for the current frame. At step 104, an address corresponding to a memory fetch request is incremented by an offset. In one embodiment, the offset is equal to a difference between the first counter and the second counter plus a threshold value. In another embodiment, the offset is equal to a value corresponding to a number of scan-lines of a frame. At step 106, the memory fetch request is issued to a memory.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
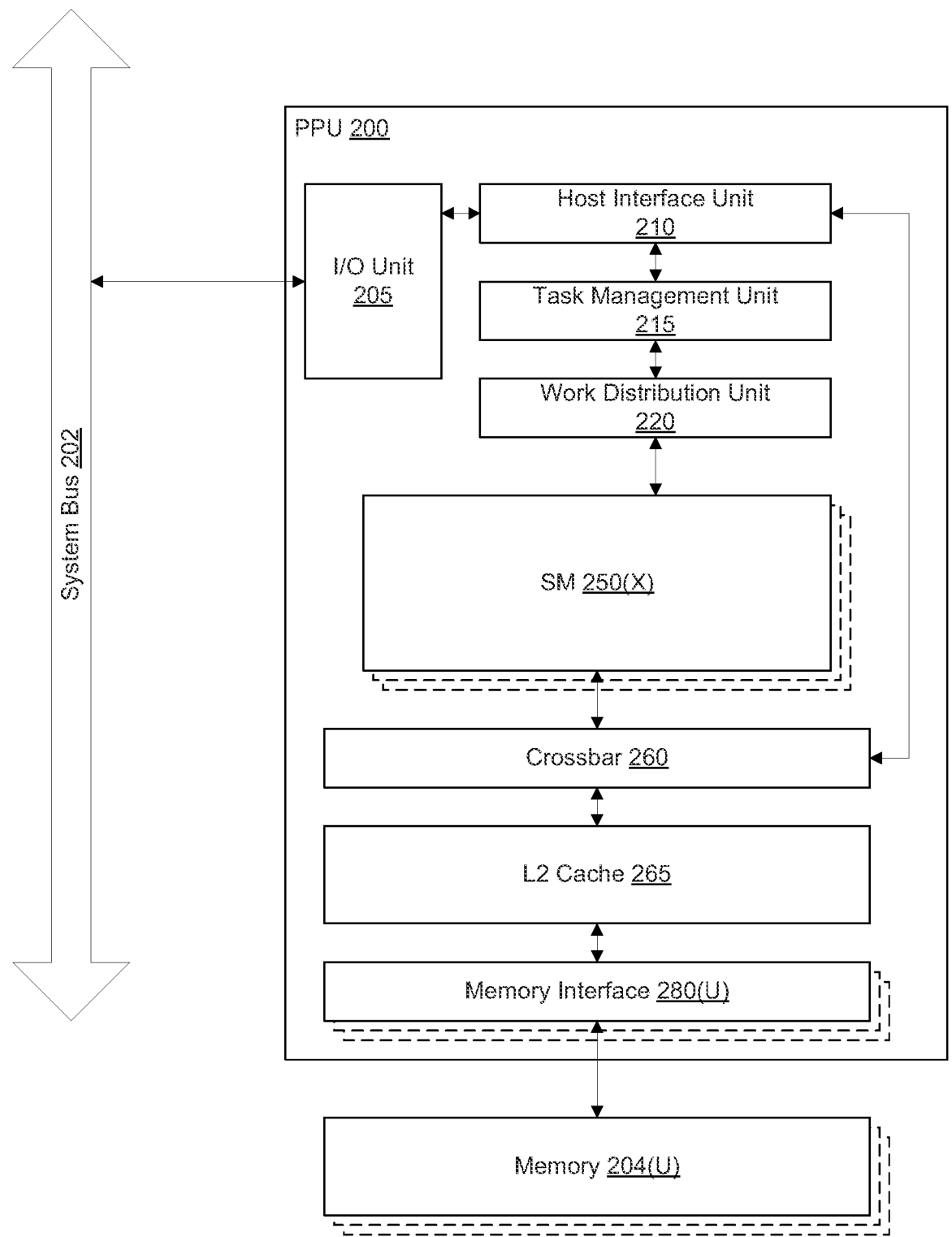
FIG. 2 illustrates a parallel processing unit (PPU), according to one embodiment.

FIG. 2 illustrates a parallel processing unit (PPU 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams. The TMU 215 selects one or more streams and is configured to organize the selected streams as a pool of pending grids. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 200 comprises X SMs 250 (X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
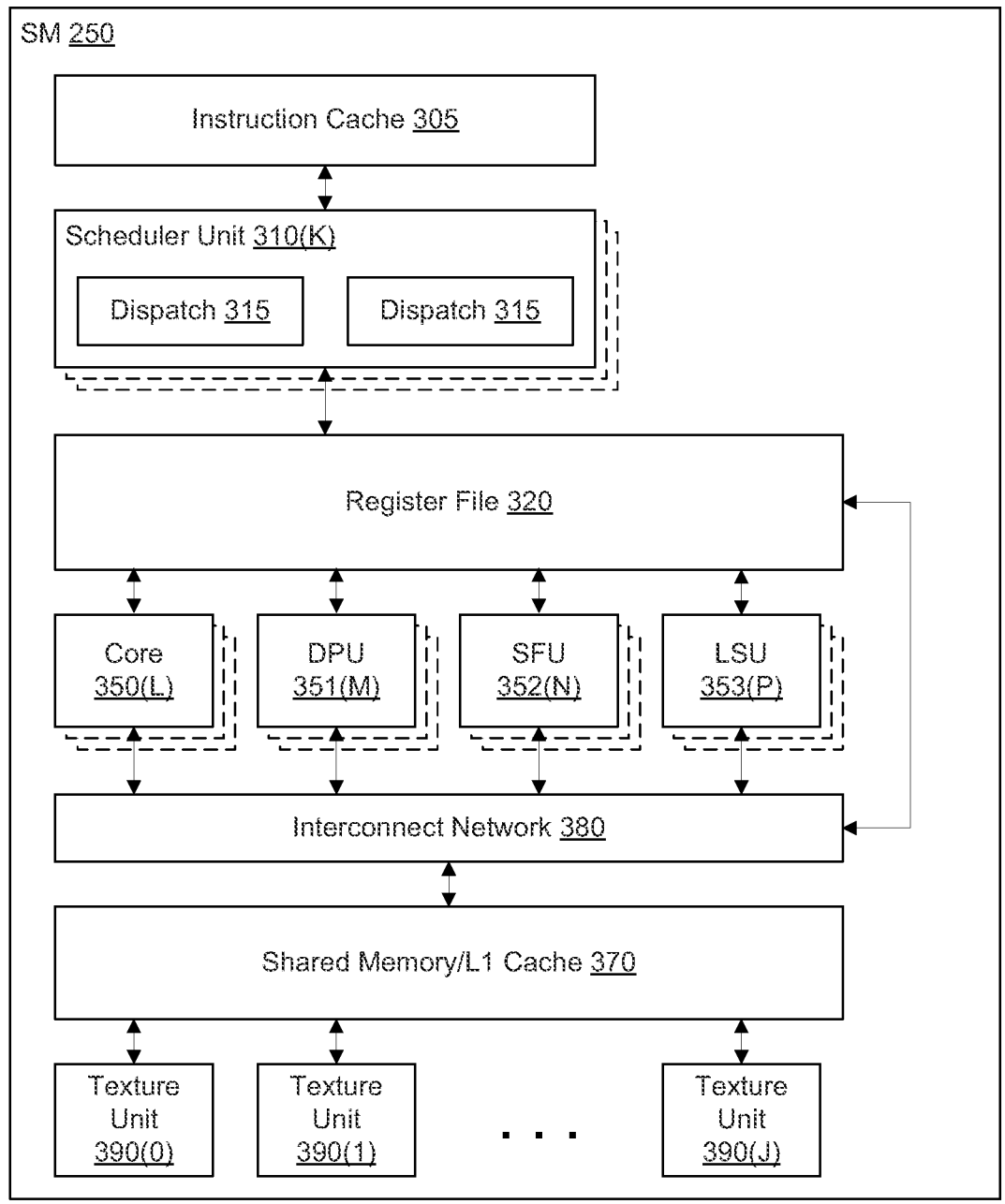
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory/L1 cache 370, and one or more texture units 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory/L1 cache 370 and the register file 320. In one embodiment, the SM 250 includes 64 DPUs 351, 32 SFUs 352, and 32 LSUs 353.

Each SM 250 includes an interconnect network 380 that connects each of the functional units to the register file 320 and the shared memory/L1 cache 370. In one embodiment, the interconnect network 380 is a crossbar that can be configured to connect any of the functional units to any of the registers in the register file 320 or the memory locations in shared memory/L1 cache 370.

In one embodiment, the SM 250 is implemented within a GPU. In such an embodiment, the SM 250 comprises J texture units 390. The texture units 390 are configured to load texture maps (i.e., a 2D array of texels) from the memory 204 and sample the texture maps to produce sampled texture values for use in shader programs. The texture units 390 implement texture operations such as anti-aliasing operations using mipmaps (i.e., texture maps of varying levels of detail). In one embodiment, the SM 250 includes 16 texture units 390.

The PPU 200 described above may be configured to perform highly parallel computations much faster than conventional CPUs. Parallel computing has advantages in graphics processing, data compression, biometrics, stream processing algorithms, and the like.

Display Controller

Figure 4A:
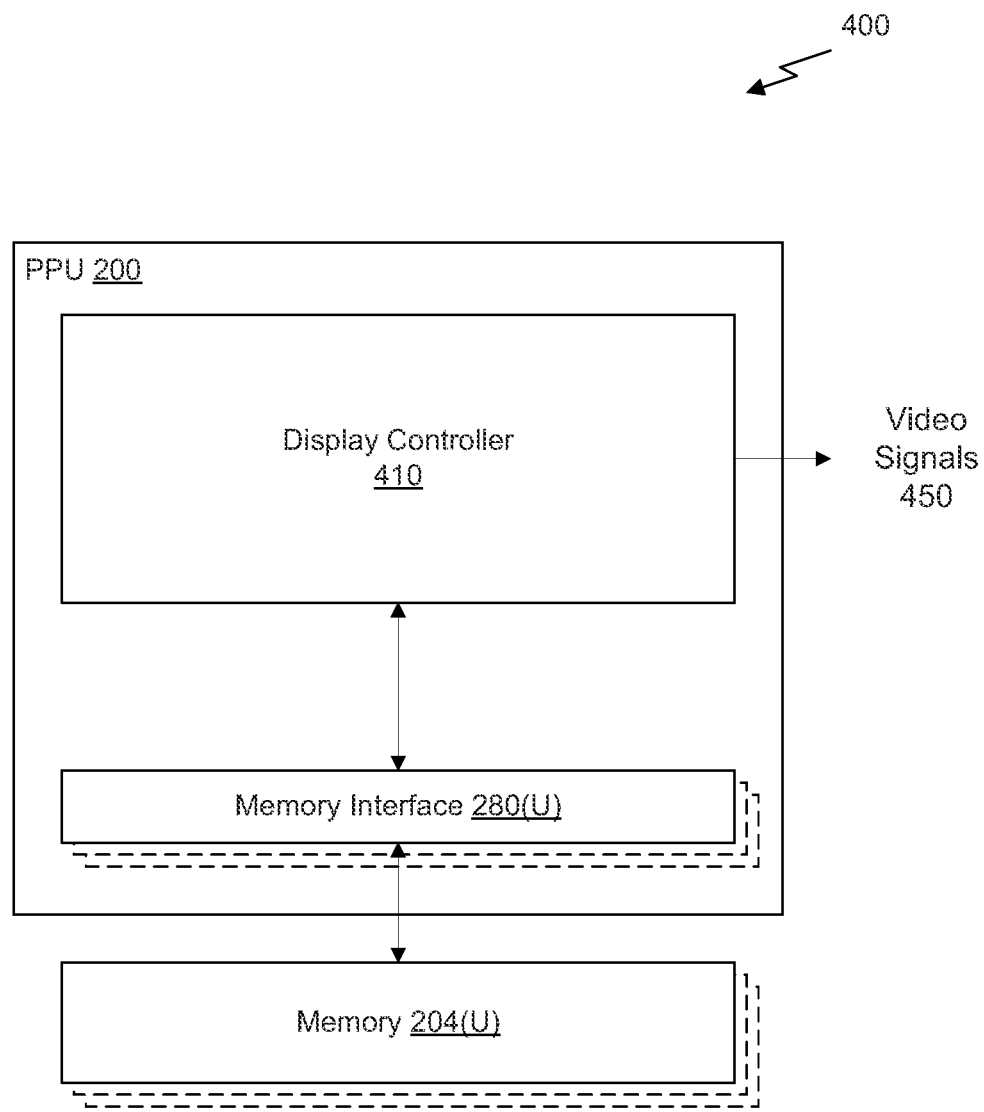
FIGS. 4A & 4B illustrate a system for implementing a fast recovery from a memory underflow condition, in accordance with one embodiment.
Figure 4B:
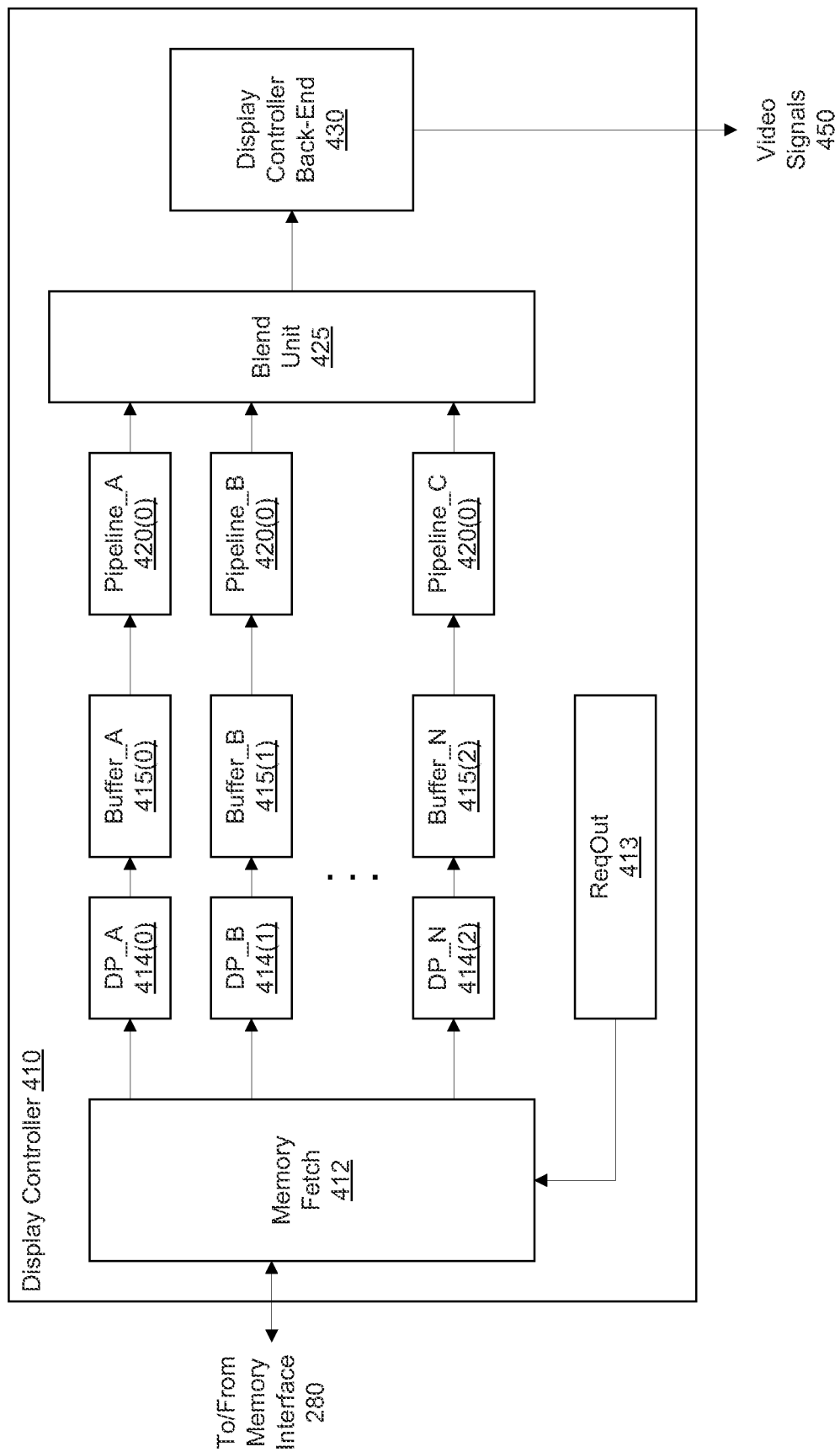

FIGS. 4A & 4B illustrate a system 400 for implementing a fast recovery from a memory underflow condition, in accordance with one embodiment. As shown in FIG. 4A, the PPU 200 includes a display controller 410 that retrieves pixel data from the memory 204 via the memory interface 280 and generates video signals 450 for output to a display device. The display controller 410 may be included as a unit within the integrated circuit of PPU 200. In alternative embodiments, the display controller 410 may be a separate and distinct integrated circuit that is located externally from PPU 200 and that is separately coupled to the memory 204.

In one embodiment, as shown in FIG. 4B, the display controller 410 includes a memory fetch unit 412. The memory fetch unit 412 receives commands from a request out unit 413 that indicate which addresses in the memory 204 the display controller 410 should fetch for a current frame. For example, the request out unit 413 may track a base address for a frame of pixel data. The pixel at the base address is fetched and then the address is incremented to give an address for the next pixel of the frame. In some cases, multiple pixels may be fetched by a particular memory request. For example, the bandwidth between the memory fetch unit 412 and the memory 204 via the memory interface 280 may be 512 bits wide. Thus, a plurality of pixels within a single scan-line of pixel data may be fetched by each memory request. In this example, the memory fetch unit 412 may request 512 bits of data representing 16 pixels at 32 bits per pixel in a single memory request. The memory fetch unit 412 tracks memory fetch requests sent to the memory 204 and collects pixel data returned from the memory 204 to route the pixel data to the correct display pipeline 420. As shown in FIG. 4B, a single request out unit 413 may handle multiple display pipelines 420. In another embodiment, each display pipeline 420 may be associated with a separate and distinct request out unit 413.

As shown in FIG. 4B, the display controller 410 may include a plurality of different display pipelines 420 for processing pixel data from different logical display surfaces in parallel. A logical display surface is a two-dimensional array of pixel data that represents an image to be displayed on the display device. Each application window on a desktop, for example, may be associated with a separate and distinct logical display surface. The logical display surfaces may be combined to generate the pixel data for each corresponding pixel in the display device. The display controller 410 has N separate and distinct display pipelines 420. The display pipelines 420 perform various processing tasks on the pixel data such as scaling the data, converting the data format (e.g., 12-bit or 15-bit pixel data to 24-bit pixel data for RGB 8-bits per channel), filtering the data, converting the colorspace of the pixel data (e.g., YUV to RGB), mapping the pixel data to a color palette having a larger bandwidth, and so forth. It will be appreciated that the display pipelines 420 may perform other pixel processing tasks not explicitly described herein and that such tasks are within the scope of the present disclosure.

The memory fetch unit 412 receives commands from the request out unit 413 that specifies memory addresses to be fetched from the memory 204. The memory fetch unit 412 transmits memory fetch requests to the memory 204 and waits to receive a response from the memory 204 with data associated with the various memory addresses. The memory fetch unit 412 may track outstanding memory fetch requests and route received data (i.e., pixel data) associated with the outstanding memory fetch requests to the correct display pipelines 420.

The memory fetch unit 412 feeds the pixel data to the data packer (DP) units 414. The DP units 414 are configured to pack the data associated with one or more memory fetch requests into an internal buffer to pass to the buffer units 415. The DP units 414 may reorder memory fetch requests within the internal buffer. The DP units 414 pass pixel data for display to the buffer units 415. Each of the buffer units 415 is an asynchronous FIFO that receives and stores a plurality of pixel data asynchronously from a pixel clock (PCLK) rate that is utilized to operate the display pipelines 420. The pixel clock rate is a frequency based on the refresh rate of the display device coupled to system 400. The memory fetch unit 412, request out unit 413 and DP units 414 may operate at a faster clock rate than the pixel clock rate. Thus, the memory fetch unit 412 can fetch pixels for each display pipeline 420 sporadically and store that pixel data in the buffer units 415 until the pixel data is needed by the display pipeline.

Each of the display pipelines 420 feeds into a blend unit 425 that combines the pixel data for different logical surfaces into a single surface for display on the display device. For example, the blend unit 425 may combine multiple logical surfaces associated with different display pipelines 420 as well as a cursor that is associated with a separate display pipeline 420. The blend unit 425 may transmit the combined pixel data to a backend unit 430 that is configured to generate the video signals 450. The backend unit 430 may format and pack the data into digital or analog signals for transmission to the display device according to the particular specification for the video signal (e.g., DisplayPort, DVI, VGA, etc.). If the video signals are analog, then the display controller backend unit 430 may include one or more DACs for converting the digital pixel data to an analog signal.

Figure 5A:
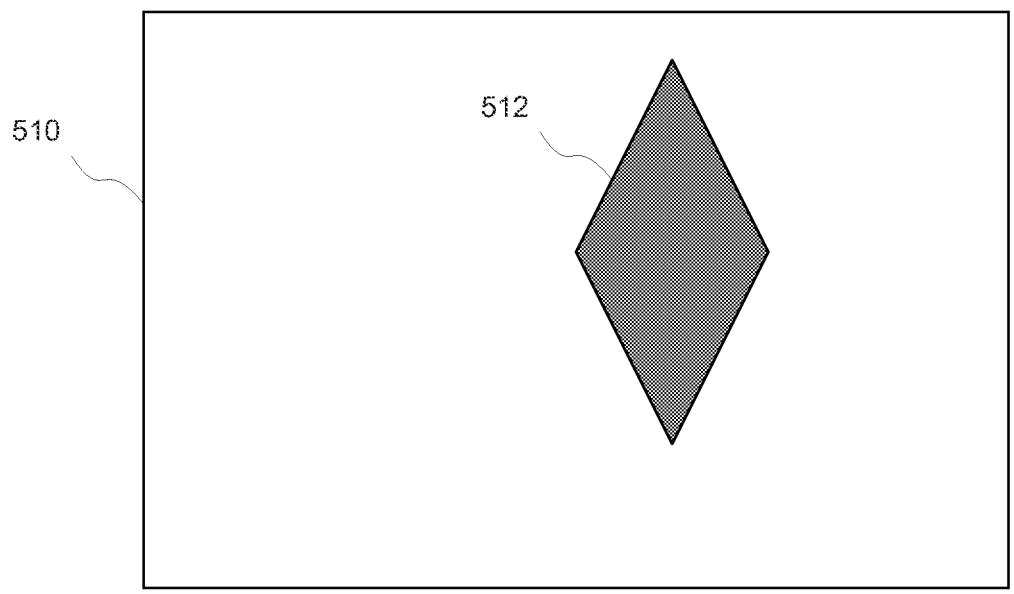
FIGS. 5A and 5B are a conceptual illustration of a memory underflow condition, in accordance with one embodiment.
Figure 5B:
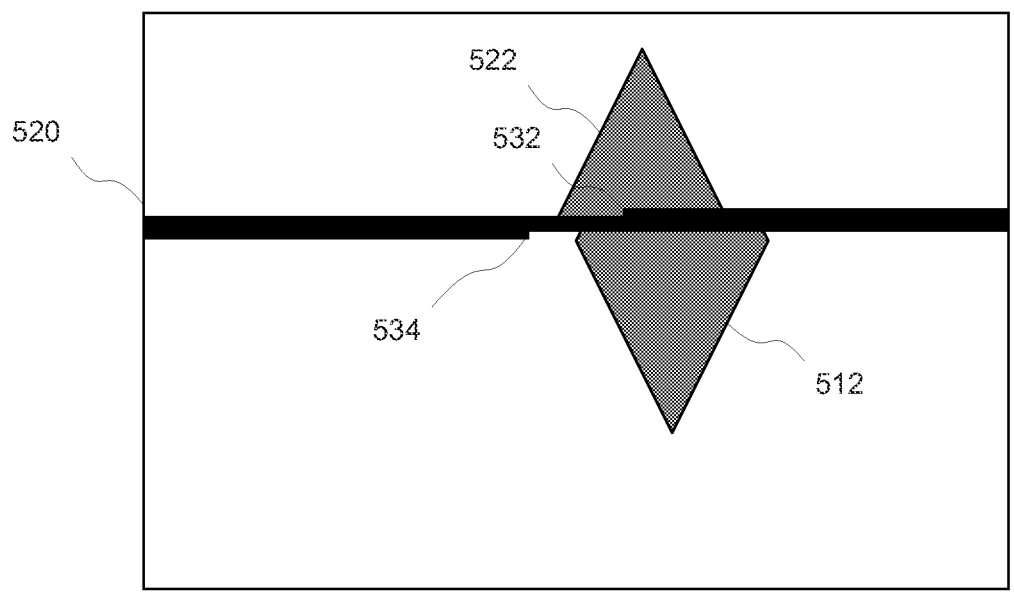

FIGS. 5A and 5B are a conceptual illustration of a memory underflow condition, in accordance with one embodiment. As shown in FIG. 5A, the display controller 410 generates video signals for a first frame 510 of video displayed on a display device. The first frame 510 of video includes a representation of a first object 512 at a first position on the screen. As shown in FIG. 5B, the display controller 410 begins to generate video signals for a second frame of video 520 immediately following the display of the first frame of video 510. At some point, the memory 204 fails to return pixel data fetched by the memory fetch unit 412 within a reasonable time. A delay might occur, for example, due to the memory 204 being overtaxed because too many units coupled to the memory 204 are requesting data at the same time. The delay might also occur when a frequency change is effectuated by the memory interface 280, a technique commonly performed to reduce power consumption. The display controller 410 can handle some amount of delay because some portion of pixel data is buffered by the buffer units 415, enabling the video signals to be generated using previously fetched pixel data. However, at some point in time, the delay may become so large that the display pipelines 420 may attempt to read pixel data for the next pixel in the frame from the buffer units 415 before the pixel data has been returned by the memory 204. For example, at a time $t_0$, the display pipelines 420 may attempt to read pixel data from the buffer units 415 associated with a pixel 432. However, the pixel data for the pixel 432 may not be received from the memory 204 by the memory fetch unit 412 by the time $t_0$. The display controller 410 cannot simply stall and wait for the pixel data to be returned by the memory 204 because the video signals 450 are time sensitive. Therefore, the display controller 410 must simply select a color for the pixel and generate the video signals based on the selected color. In one embodiment, the display controller 410 selects a constant color (e.g., black) for the pixels which are not returned to the display controller 410 in time. Pixels not returned to the display controller 410 by the time the display pipelines 420 attempt to read the pixel data for the pixels from the buffer units 415 may be referred to herein as underflow pixels. In another embodiment, the display controller 410 may select the color corresponding to the last pixel successfully read from the buffer units 415 and replay that color for adjacent pixels until the memory fetch unit 412 has time to "catch-up" to the video signals 450.

Typically, short-term underflow conditions (i.e., pixels worth of missing data) may arise as a result of an over-taxed memory system (e.g., when the memory 204 has too many units trying to access the memory 204 at the same time). Long-term underflow conditions (i.e., scan-lines worth of missing data) arise as a result of changes of frequency within the memory interface 280. For short-term underflow conditions, the memory fetch unit 412 and request out unit 413 may be able to "catch-up" during the horizontal blanking period within a video signal. In other words, the video signals may get behind by fifteen or twenty pixels within a particular scan-line, thereby not being able to display the correct color for those pixels at the end of the scan-line. However, during the horizontal blanking period at the end of the scan-line, the memory fetch unit 412 may receive enough data to at least partially fill the line buffer units 415 with some pixel data from the next scan-line. In some cases, the memory fetch unit 412 cannot receive enough pixel data during the horizontal blanking period to "catch-up" when the memory fetch unit 412 is significantly behind. As shown in FIG. 5B, the video signals 450 have advanced to a time $t_1$ associated with reading pixel 534 from the line buffer units 415, and the display controller 410 has not been able to "catch-up" with the video signals 450 over at least the previous two scan-lines. If the system 400 has experienced a long-term memory underflow condition, then the same color may be used to refresh each and every pixel in the remaining portion of the second frame 520. In addition, if the magnitude of the memory underflow condition is serious enough, the display controller 410 may not be able to fully recover during the vertical blanking period of the video signals 450, which is typically much longer than a horizontal blanking period. If this is the case, then the display controller 410 may not be able to provide valid pixel data for the next frame of video at the start of refreshing the display device for the next frame such that the memory underflow condition causes image artifacts to propagate to the next frame. Although the display controller 410 cannot control the causes which lead to the memory underflow conditions, certain advantages may be realized for recovering from a memory underflow condition and preventing image artifacts from propagating to the next frame of video.

Returning now to FIG. 4B, various units of the display controller 410 may be configured to monitor the magnitude of a memory underflow condition and adjust the operation of the various units within the display controller 410 to recover from the memory underflow condition more quickly when compared to prior art display controllers. In one embodiment, the display pipelines 420 may be configured to monitor the number of underflow pixels when a memory underflow condition occurs. At least one unit within each of the display pipelines 420 may include an underflow_counter that is incremented for each rising edge of the pixel clock (i.e., for each pixel) and decremented for each pixel read from the buffer unit 415. As a memory underflow condition occurs, the underflow_counter will be incremented but not decremented because there is no available pixel data in the buffer unit 415. Thus, the underflow_counter value measures the magnitude of the memory underflow condition. A small underflow_counter value indicates a potential short-term underflow condition that could be recovered from during the next horizontal blanking period. A large underflow_counter value indicates a potential long-term underflow condition that could cause image artifacts to propagate to the next frame of video.

Alternatively, the request out unit 413 may include a req_out_counter for each of the display pipelines 420 that represents a number of pixels in the current frame that have been requested by the request out unit 413 for each of the display pipelines 420. In addition, each of the display pipelines 420 may include a corresponding scanout_counter that indicates a number of pixels in the current frame that have been read from the buffer units 415 by the display pipelines 420. If the req_out_counter is less than the scanout_counter then a memory underflow condition has occurred. The magnitude of the memory underflow condition is then given by the difference between the req_out_counter and the scanout_counter.

It will be appreciated that memory underflow conditions may be monitored for each of the display pipelines 420 within the display controller 410. In other words, each surface may be associated with a separate and distinct underflow_counter, scanout_counter, and req_out_counter that enables the request out unit 413 to control the memory addresses output to the memory fetch unit 412 for each of the display pipelines 420 separately.

In one embodiment, when pixel data corresponding to underflow pixels is received by the memory fetch unit 412, the pixel data is stored in the buffer unit 415 and immediately read and discarded by the display pipeline 420 until the underflow_counter reaches zero, thereby indicating that the display controller 410 has caught-up to the video signal 450. The operation of reading and discarding underflow pixels from the buffer unit 415 continues even during the horizontal blanking period. Once valid pixel data is available at the input to the display pipeline 420 (i.e., the underflow_counter reaches zero), the display pipeline 420 returns to normal operation. While this technique may be sufficient to overcome short-term underflow conditions, simply waiting for the underflow condition to self-correct during the horizontal blanking period may not be sufficient to catch-up before the start of the next frame.

In one embodiment, when the req_out_counter is less than the scanout_counter, the request out unit 413 includes logic that increments the memory address associated with the next pixel to fetch by some offset value. In other words, the memory fetch unit 412 may be so far behind the video signals 450, that fetching pixels in the next scan-line is a futile operation because there is little to no chance that pixel data for the scan-line will be returned to the memory fetch unit 412 before the display pipeline 420 reads that pixel data from the buffer units 415 to generate video signals 450 for the display device. Thus, the request out unit 413 may increment the memory address associated with the next memory fetch request by a value corresponding to a number of pixels such that the pixel data returned to the display pipeline 420 is advanced to a point in the current frame that is sufficiently far enough ahead of the video signals 450 that the pixel data has a chance to be returned to the memory fetch unit 412 by the memory 204 in time to be read by the display pipeline 420.

The offset may be set to a value that corresponds to a small number of pixels (e.g., two scan-lines worth of pixels) in order to recover from short-term memory underflow conditions. Alternatively, the offset may be set to a value that corresponds to a large number of pixels (e.g., the number of scan-lines remaining in the current frame) in order to recover from long-term memory underflow conditions. For example, when the underflow_counter indicates that the memory fetch unit 412 is behind the video signals by a small number of pixels equal to, for example, one scan-line, the request out unit 413 may increment the address associated with the next memory fetch request by an offset corresponding to three scan-lines to attempt to alleviate the memory underflow condition. In this manner, the display controller 410 may attempt to reduce the image artifacts caused by the memory underflow condition sooner than prior art display controllers. Alternatively, when the underflow_counter indicates that the memory fetch unit 412 is behind the video signals by a large number of pixels equal to, for example, ten scan-lines, the request out unit 413 may increment the address associated with the next memory fetch request by an offset corresponding to the number of scan-lines remaining in the current frame to attempt to alleviate the memory underflow condition by the start of the next frame.

In one embodiment, the offset is set equal to a difference between the scanout_counter and the req_out_counter plus some threshold value. The offset is set in this manner to always advance the memory address associated with the next memory fetch request to be some threshold number of pixels beyond the current pixel being read from the buffer unit 415. The size of the threshold value may be adjusted based on the magnitude of the memory underflow condition. For example, when the underflow_counter indicates a short-term memory underflow condition, the threshold value may be smaller than when the underflow_counter indicates a long-term memory underflow condition.

In another embodiment, the request out unit 413 is only configured to advance the address associated with the next memory fetch request when the video signal 450 is nearing the end of the current frame. When the scanout_counter is greater than a threshold value (e.g., a value equal to 80% of the pixel in the frame), then the display controller 410 stops outputting memory fetch requests for the current frame and increments the address for the next memory fetch request to correspond to a pixel at the beginning of the next frame of video. In effect, when the display controller 410 estimates that the number of pixels left to scanout in the current frame is small enough that the memory underflow condition cannot be corrected, the request out unit 413 begins fetching data for the next frame of video and skips fetching any additional data for the current frame of video.

In one embodiment, each DP unit 414 is associated with a corresponding tag FIFO that tags each memory fetch request with a "frame" bit that indicates whether the pixel data associated with the memory fetch request corresponds to the current frame or the next frame. When the request out unit 413 generates a memory fetch request for a particular display pipeline 420, the request out unit 413 may also write a "frame" bit to the tag FIFO for that display pipeline 420. Because data corresponding to the memory fetch requests are returned to the memory fetch unit 412 in the order the memory fetch requests were transmitted to the memory 204, the DP units 414 can check which frame pixel data returned by the memory fetch unit 412 belongs to. When the scanout of a particular frame ends (i.e., video signals indicate that scanning out the last pixel of a frame is complete), a value indicating which frame is being scanned out is toggled. The value may take the form of either a zero or a one. As the request out unit 413 generates memory fetch requests, the request out unit 413 also writes a "frame" bit to the tag FIFO that indicates whether the data is associated with the current frame or the next frame. As the value representing the current frame is toggled at the start of scanout of the current frame, any pixel data in the buffer units 415 associated with the previous frame may be discarded (i.e., cleared from the memory in the buffer units 415). In addition, after the current frame has started scanout, the DP units 414 may simply discard any pixel data that is associated with the previous frame. As the DP units 414 receive pixel data for a particular memory fetch request, the DP units 414 compare the "frame" bit associated with the memory fetch request with the value representing the current frame. If the "frame" bit associated with the memory fetch request does not match the value representing the current frame, then the pixel data may be discarded because the pixel data corresponds to pixel data for the previous frame of video.

In one embodiment, the value representing the current frame of video is toggled at the start of the vertical synchronization signal (VSYNC). The time during the vertical synchronization signal enables pixel data for the first pixel in the next frame to be returned to the display controller 410. Thus, the memory underflow condition encountered during the previous frame does not cause image artifacts to propagate to the next frame. At the start of the vertical synchronization signal, the underflow_counter, scanout_counter, and req_out_counter for each of the display pipelines 420 may be reset in order to track the memory underflow conditions encountered during the next frame.

In one embodiment, a memory underflow condition may occur for a logical surface that is overlaid on top of a different surface. For example, a logical surface may be allocated for a cursor. The cursor is overlaid over other logical surfaces such as a desktop or an application window. In such cases, the display pipeline 420 for that surface may be configured to output a pixel value with an alpha channel of zero (i.e., transparent) when a memory underflow condition is detected. In other words, rather than output invalid pixel data such as a default color or the color associated with the last valid pixel prior to the memory underflow condition, the display pipeline 420 causes the pixels associated with underflow pixels to be completely transparent. That way, when the blend unit 425 generates the blended pixel data for the surface that defines the image for display, the underlying pixel data is displayed rather than the invalid data caused by the memory underflow condition.

Figure 6A:
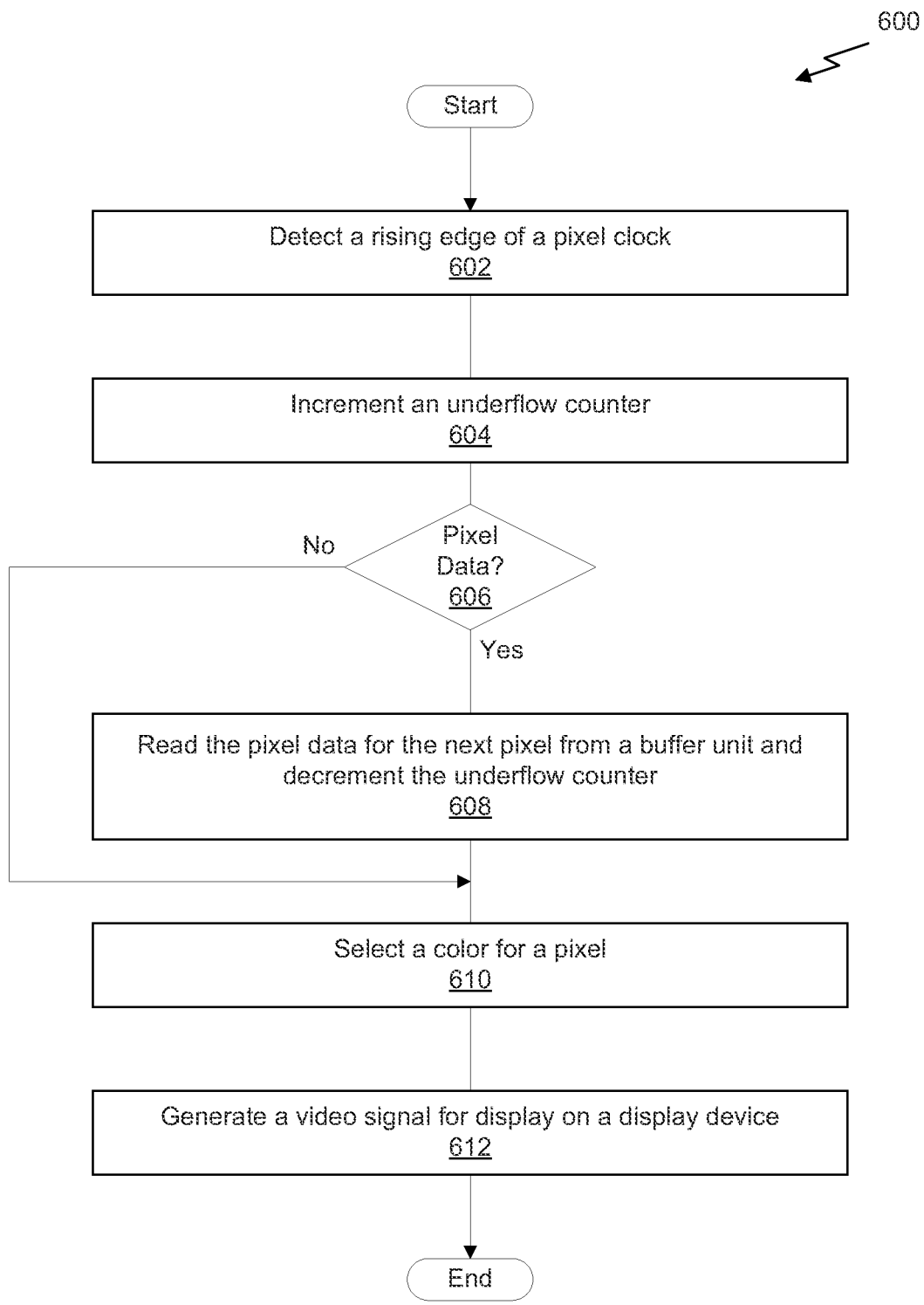
FIGS. 6A & 6B illustrate flowcharts of methods for recovering from a memory underflow condition, in accordance with another embodiment.
Figure 6B:
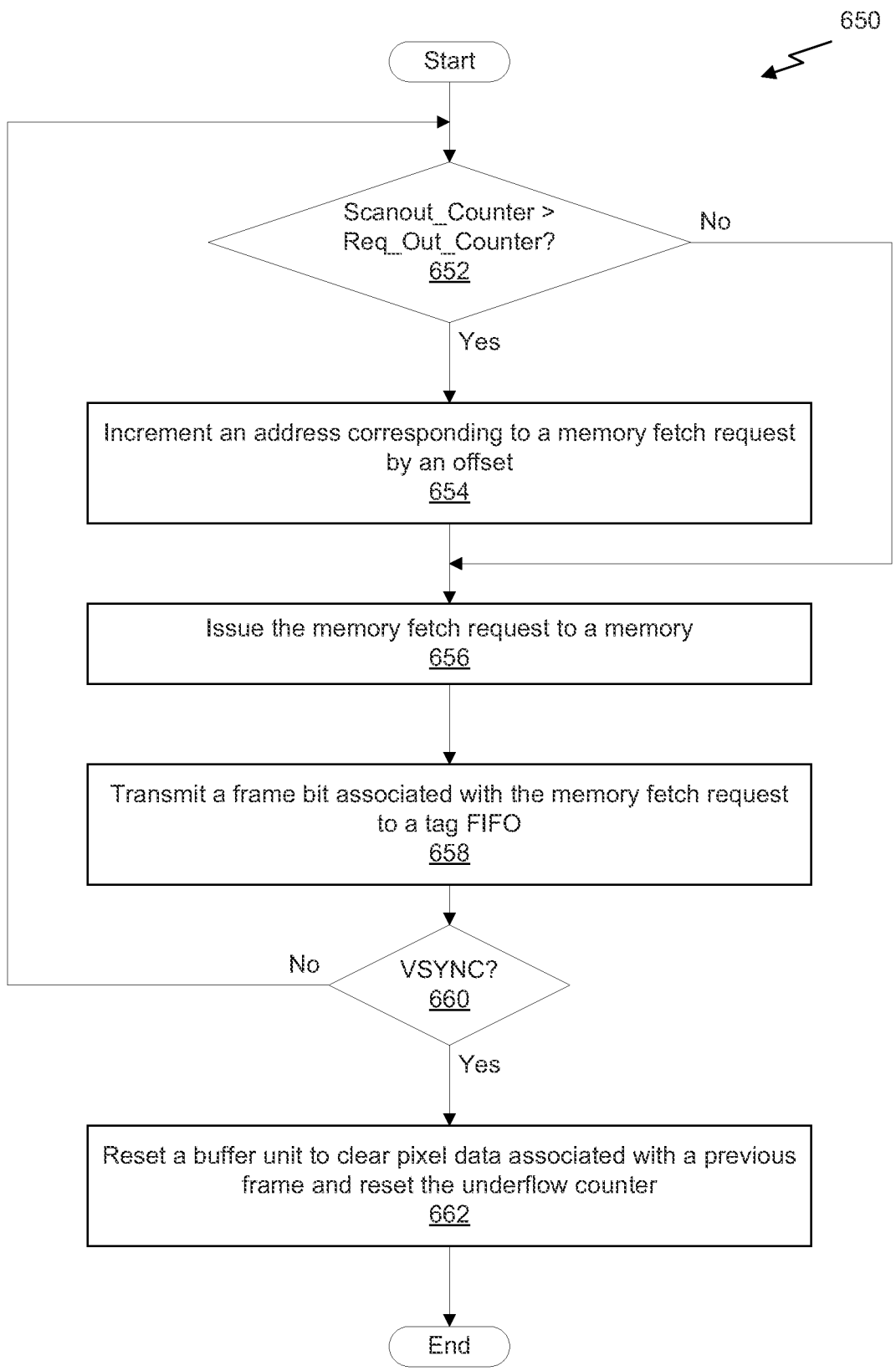

FIGS. 6A & 6B illustrate flowcharts of methods 600 and 650 for recovering from a memory underflow condition, in accordance with another embodiment. As shown in FIG. 6A, the method 600 begins at step 602, where the display pipeline 420 detects the rising edge of a pixel clock (PCLK). The rising edge of the pixel clock indicates that the next pixel in the current frame should be read from the buffer unit 415 to generate the video signals 450. In one embodiment, the falling edge of the pixel clock may be used to trigger reading the next pixel from the buffer unit 415. At step 604, the display pipeline 420 increments an underflow_counter. At step 606, the display pipeline 420 attempts to read pixel data corresponding to the next pixel in the frame from the buffer unit 415. If the pixel data is in the buffer unit 415, then the method 600 proceeds to step 608 where the display pipeline 420 reads the pixel data for the next pixel and decrements the underflow_counter. In one embodiment, when the pixel data is received from the memory 204, a DP unit 414 may read a frame identifier (i.e., one or more bits) associated with the pixel data from a tag FIFO. The DP unit 414 may compare the frame identifier to a value corresponding to the current frame. If the frame identifier is not equal to the value, then the DP unit 414 may discard the pixel data.

Returning to step 606, if the pixel data for the next pixel is not in the buffer unit 415 (i.e., the pixel data for the next pixel has not been received by the memory fetch unit 412), then the method 600 proceeds to step 610 where a color for the pixel is selected by the display pipeline 420. If the pixel data for the next pixel was read from the buffer unit 415, then the display pipeline 420 selects the color as specified in the pixel data for the next pixel. However, if the pixel data was not read from the buffer unit 415, then the display pipeline 420 may select another color for the next pixel. In one embodiment, the display pipeline 420 selects a default color to use for all underflow pixels. In another embodiment, the display pipeline 420 selects a color equal to a color of a previous valid pixel read by the display pipeline 420. In other words, the display pipeline 420 may buffer the last color read from the buffer unit 415 and copy that color for any underflow pixels until another valid pixel color is read from the display pipeline 420. At step 612, the display controller 410 generates a video signal 450 for display on a display device.

As shown in FIG. 6B, a method 650 begins at step 652, where a request out unit 413 determines whether the scanout_counter is greater than the req_out_counter. If the scanout_counter is greater than the req_out_counter, then the method 650 proceeds to step 654, where the request out unit 413 increments an address corresponding to a memory fetch request by an offset. At step 656, the memory fetch unit 412 issues the memory fetch request to the memory 204. At step 658, the request out unit 412 transmits a frame identifier associated with the memory fetch request to a tag FIFO. Returning to step 652, if the scanout_counter is less than or equal to the req_out_counter, then the method 650 proceeds to step 656 and step 658 without incrementing the address corresponding to the memory fetch request.

At step 660, the display controller 410 monitors the video signals to detect a vertical synchronization signal (VSYNC). If the display controller 410 does not detect the VSYNC signal, then the method 650 returns to step 652 and issues additional memory fetch requests for the next pixels in the frame. However, if the display controller 410 detects the VSYNC signal, then, at step 662, the display controller resets the buffer unit 415, clearing any pixel data stored in the buffer unit 415 that is associated with the previous frame. The underflow_counter, scanout_counter, and req_out_counter are reset to zero for the start of the next frame. The method 650 may be repeated for each frame of video displayed on the display device.

Figure 7:
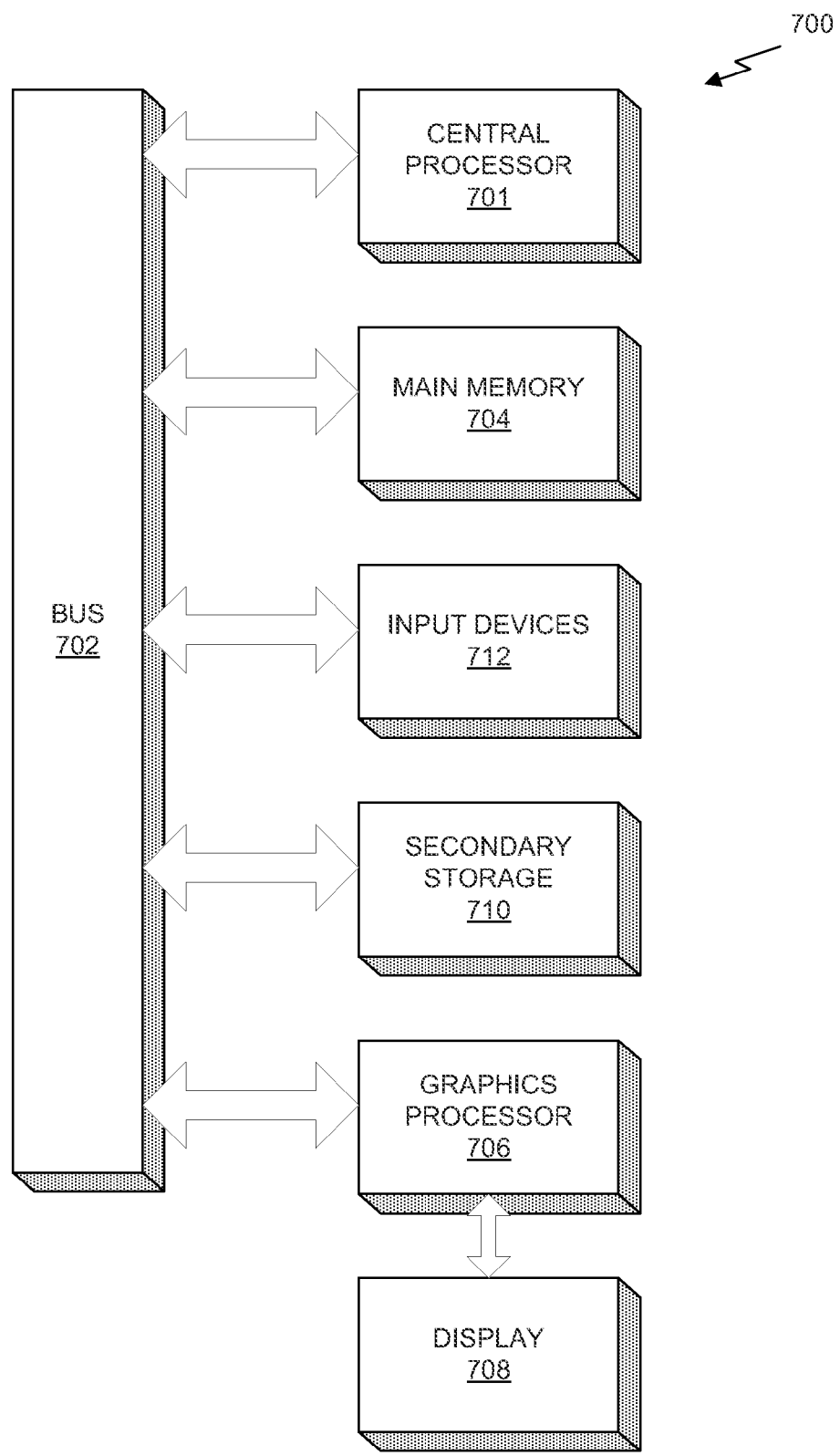
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
  determining that a first counter is greater than a second counter, wherein the first counter represents a number of pixels that have been read by a display pipeline for a current frame and the second counter represents a number of pixels requested from a memory for the current frame;
  incrementing an address corresponding to a memory fetch request by an offset; and
  issuing the memory fetch request to a memory,
  wherein the offset is equal to the difference between the first counter and the second counter plus a threshold value.

2. The method of claim 1, wherein the offset is equal to a value that corresponds to one or more scan-lines.

3. The method of claim 1, further comprising:
  detecting a vertical synchronization signal that indicates a boundary for a next frame;
  resetting a buffer unit to clear pixel data associated with a previous frame; and
  resetting the first counter and the second counter.

4. The method of claim 1, further comprising transmitting a frame identifier associated with the memory fetch request to a tag FIFO.

5. The method of claim 4, further comprising:
  receiving pixel data corresponding to the memory fetch request;
  reading the frame identifier from the tag FIFO; and
  comparing the frame identifier to a value corresponding to the current frame.

6. The method of claim 5, further comprising discarding the pixel data if the frame identifier is not equal to the value.

7. The method of claim 1, further comprising selecting a default color for a pixel when a third counter is greater than zero.

8. The method of claim 1, further comprising selecting a color for a pixel when a third counter is greater than zero, wherein the color is equal to a color of a previous pixel read by a display pipeline when the third counter is equal to zero.

9. The method of claim 1, further comprising selecting a color for a pixel when a third counter is greater than zero, wherein an alpha channel of the color is equal to zero.

10. The method of claim 1, wherein the offset is adjusted based on a magnitude of the difference between the first counter and the second counter.

11. A non-transitory computer-readable storage medium storing instructions that, when executed by a processor, cause the processor to perform steps comprising:
    determining that a first counter is greater than a second counter, wherein the first counter represents a number of pixels that have been read by a display pipeline for a current frame and the second counter represents a number of pixels requested from a memory for the current frame;
    incrementing an address corresponding to a memory fetch request by an offset; and
    issuing the memory fetch request to a memory,
    wherein the offset is equal to the difference between the first counter and the second counter plus a threshold value.

12. The non-transitory computer-readable storage medium of claim 11, the steps further comprising transmitting a frame identifier associated with the memory fetch request to a tag FIFO.

13. The non-transitory computer-readable storage medium of claim 12, the steps further comprising:
    receiving pixel data corresponding to the memory fetch request;
    reading the frame identifier from the tag FIFO; and
    comparing the frame identifier to a value corresponding to the current frame.

14. The non-transitory computer-readable storage medium of claim 13, the steps further comprising discarding the pixel data if the frame identifier is not equal to the value.

15. A system, comprising:
    a memory configured to store pixel data; and
    a display controller configured to:
        determine that a first counter is greater than a second counter, wherein the first counter represents a number of pixels that have been read by a display pipeline for a current frame and the second counter represents a number of pixels requested from a memory for the current frame,
        increment an address corresponding to a memory fetch request by an offset, and
        issue the memory fetch request to a memory,
        wherein the offset is equal to the difference between the first counter and the second counter plus a threshold value.

16. The system of claim 15, wherein the display controller includes a plurality of display pipelines configured to modify pixel data for display on a display device.

17. The system of claim 16, wherein each of the display pipelines is coupled to a corresponding buffer unit configured to store pixel data associated with memory fetch requests until the pixel data is read by the display pipeline.

18. The system of claim 15, wherein the display controller is included within a graphics processing unit.

* * * * *